(12) United States Patent
Daga et al.

(10) Patent No.: US 12,579,154 B2
(45) Date of Patent: Mar. 17, 2026

(54) SYSTEM AND METHOD OF INFORMATION EXTRACTION, SEARCH AND SUMMARIZATION FOR SERVICE ACTION RECOMMENDATION

(71) Applicant: Siemens Medical Solutions USA, Inc., Malvern, PA (US)

(72) Inventors: Saurav Daga, Bangalore (IN); Robert Peter Hurley, III, Knoxville, TN (US); Brian Morris, Maryville, TN (US); Priyanka Saxena, Lucknow (IN)

(73) Assignee: Siemens Medical Solutions USA, Inc., Malvern, PA (US)

( * ) Notice: Subject to any disclaimer, the term of this patent is extended or adjusted under 35 U.S.C. 154(b) by 261 days.

(21) Appl. No.: 18/051,889

(22) Filed: Nov. 2, 2022

(65) Prior Publication Data

US 2024/0143603 A1      May 2, 2024

(51) Int. Cl.
*G06F 16/2457* (2019.01)
*G06F 16/242* (2019.01)

(52) U.S. Cl.
CPC ...... *G06F 16/24578* (2019.01); *G06F 16/243* (2019.01)

(58) Field of Classification Search
CPC .. G06F 16/24578; G06F 16/243; G06F 18/22; G06F 16/34; G06F 40/131; G06F 40/169; G06F 40/284; G06F 16/31; G06F 9/5016; G06F 9/505; G06F 9/5077; G06F 16/9535; G06F 16/3344; G06F 40/117;
(Continued)

(56) References Cited

U.S. PATENT DOCUMENTS

| | | | |
|---|---|---|---|
| 9,086,960 | B2 | 7/2015 | Mahindru et al. |
| 10,762,544 | B2 | 9/2020 | Grabarnik et al. |
| 11,023,306 | B2 | 6/2021 | Vedurumudi et al. |
| | | (Continued) | |

FOREIGN PATENT DOCUMENTS

| | | |
|---|---|---|
| EP | 720090 | 7/1996 |
| EP | 784275 | 7/1997 |
| WO | 2005062202 | 7/2005 |

OTHER PUBLICATIONS

Deng, Advanced search system for IT support services, pp. 27-40 (Year: 2017).*

(Continued)

*Primary Examiner* — Albert M Phillips, III

(57) ABSTRACT

A service intelligence system is disclosed. The service intelligence system receives a search query, identifies anomalous machine codes for a machine associated with the search query, selects one or more historical data elements based on a similarity score between the identified anomalous machine codes and machine codes associated with the one or more historical data elements, ranks the one or more historical data elements based on the similarity score, selects a predetermined number of the one or more historical data elements based on descending rank order, and provides at least one corrective action or at least one part replacement associated with the tag for each of the predetermined number of highest ranked historical data elements in response to the search query. The machine codes are identified for a predetermined time period and each of the one or more historical data elements is associated with a tag.

12 Claims, 9 Drawing Sheets

(58) Field of Classification Search
CPC .... G06Q 10/107; G06Q 10/063; G06Q 10/20;
G06Q 30/015; G06N 5/02
See application file for complete search history.

(56) References Cited

U.S. PATENT DOCUMENTS

| 2016/0147737 | A1 | 5/2016 | Ryu et al. |
| 2019/0130468 | A1 | 5/2019 | Lerman et al. |
| 2021/0004284 | A1 | 1/2021 | Vah et al. |

OTHER PUBLICATIONS

Han, Towards Effective Extraction and Linking of Software Mentions from User-Generated Support Tickets, pp. 2263-2271 (Year: 2018).*
Dictionary.com, Collins English Dictionary, "machine code," p. 1 (Year: 2012).*
Zhu, Towards More Effective Solution Retrieval in IT Support Services Using Systems Log, pp. 730-744, (Year: 2016).*
European Search Report for Corresponding EP Application No. EP 23207436, dated Mar. 6, 2024.

* cited by examiner

350

352   Receive Set of Service Tickets

354   Extract Machine and Time Details

356   Obtain Machine Logs for Machine and Time

358   Identify Anomalous Machine Logs

360   Associate Anomalous Events with Tags

362   Store Service Tickets, Anomalous Events, and Tags

550

552    Receive Search Query and Obtain Search Results

554    Sort Search Results

556    Calculate Weighted Rank Value

558    Select Top N Results

560    Calculate Weighted Sum for Top N Results

562    Identify Sub-Component

SYSTEM AND METHOD OF INFORMATION EXTRACTION, SEARCH AND SUMMARIZATION FOR SERVICE ACTION RECOMMENDATION

FIELD OF DISCLOSURE

The present disclosure generally relates to knowledge based service intelligence systems that utilize machine logs or event records for knowledge searching.

BACKGROUND

In order to address issues faced in a technical context, such as in technical products or associated services, a user, such as a customer or support person, can utilize personal knowledge, manuals and other documentation, and/or browse knowledge systems updated and maintained by experts to identify resolutions. Knowledge systems can provide catalogs of possible issues and mappings to potential resolutions. However, current manual knowledge systems are not comprehensive and cannot include all possible issues and resolution mappings.

When browsing a knowledge base, users can additionally encounter ambiguity regarding symptoms, issues, root causes, or possible resolutions. For example, the same symptom can be caused by multiple different underlying root causes, each one requiring a different resolution. As another example, in some instances, a first issue can require replacement of a part while a second, similar issue may not require replacement of the part, such as a blue screen potentially indicating a software crash (requiring a force restart or software driver re-installation) or potentially indicating a failed monitor or video card (requiring replacement of that part). Current knowledge bases are not capable of identifying different potential issues and resolutions.

Systems, such as medical scanners or computer systems, generate a plurality of machine logs. Such logs are records of events that may have occurred in the system and include information associated with such events. The event records can also be indicators of anomalous events or defects that arise in the system. The event records can include complex information which may not be readable or understandable by a user. For example, the event records can include technical keywords associated with the system which can be difficult for the user to understand. Therefore, identification of event records associated with anomalous events may not be straightforward and thereby lead to difficulty in identifying the cause of bug in the system. Furthermore, it is also impossible to annotate the event records using manual effort to distinguish between normal and anomalous events occurring in the system. Due to these limitations, current knowledge base systems cannot reliably utilize machine logs or event records for knowledge searching.

SUMMARY

In various embodiments, a service intelligence system is disclosed. The service intelligence system includes a memory having instructions stored thereon and a processor configured to read the instructions. The processor is configured to receive a search query and identify anomalous machine codes for a machine associated with the search query. The machine codes are identified for a predetermined time period. The processor is further configured to select one or more historical data elements based on a similarity score between the identified anomalous machine codes and machine codes associated with the one or more historical data elements. Each of the one or more historical data elements is associated with a tag. The processor is further configured to rank the one or more historical data elements based on the similarity score, select a predetermined number of the one or more historical data elements based on descending rank order, and provide at least one corrective action or at least one part replacement associated with the tag for each of the predetermined number of highest ranked historical data elements in response to the search query In various embodiments, a service intelligence system is disclosed. The service intelligence system includes a memory having instructions stored thereon and a processor configured to read the instructions. The processor is configured to receive a plurality of historical data elements and identify a plurality of tags for the historical data elements. The plurality of historical data elements are associated with corrective actions or part replacements performed for at least one machine and the tags are generated by natural language processing. The processor is further configured to identify one or more anomalous machine codes associated with at least one of the plurality of historical data elements. The one or more anomalous machine codes are associated with a predetermined time period corresponding to a service issue represented by the historical data element. The processor is further configured to associate the one or more anomalous machine codes with at least one of the plurality of tags for the historical data elements.

In various embodiments, a service intelligence system is disclosed. The service intelligence system includes a memory having instructions stored thereon and a processor configured to read the instructions. The processor is configured to implement a backend process and a frontend process. The backend process includes receiving a plurality of historical data elements and generating a plurality of tags for the historical data elements. The plurality of historical data elements are associated with at least one corrective action, at least one part replacement, or a combination thereof, and the tags are generated by a natural language processing component. The backend process further includes a step of associating one or more anomalous machine codes with at least one of the plurality of tags for the historical data elements. The frontend process includes receiving a search query, identifying anomalous machine codes for a machine associated with the search query for a predetermined time period, selecting one or more of the historical data elements based on a similarity score between the identified anomalous machine codes for the machine associated with the search query and the machine codes associated with the historical data element, ranking the selected one or more of the historical data elements based on the similarity score, selecting a predetermined number of highest ranked historical data elements, and providing a set of corrective actions or part replacements associated with one or more tags associated with the predetermined number of highest ranked historical data elements in response to the search query.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for providing an intelligence service platform using one or more natural language processing (NLP) models to extract corrective action tags and associated resolutions from a dataset including service ticket data and/or machine log data and generate a set of the most common and/or likely resolutions for the corrective action tag(s). Features, advantages or alternative embodiments herein can be assigned to the other claimed objects and vice versa. In other words, claims for methods and systems for generating an intelligence service platform can be improved with features described or claimed in context of the methods and systems for implementing an intelligence service platform, and vice versa.

Figure 1:
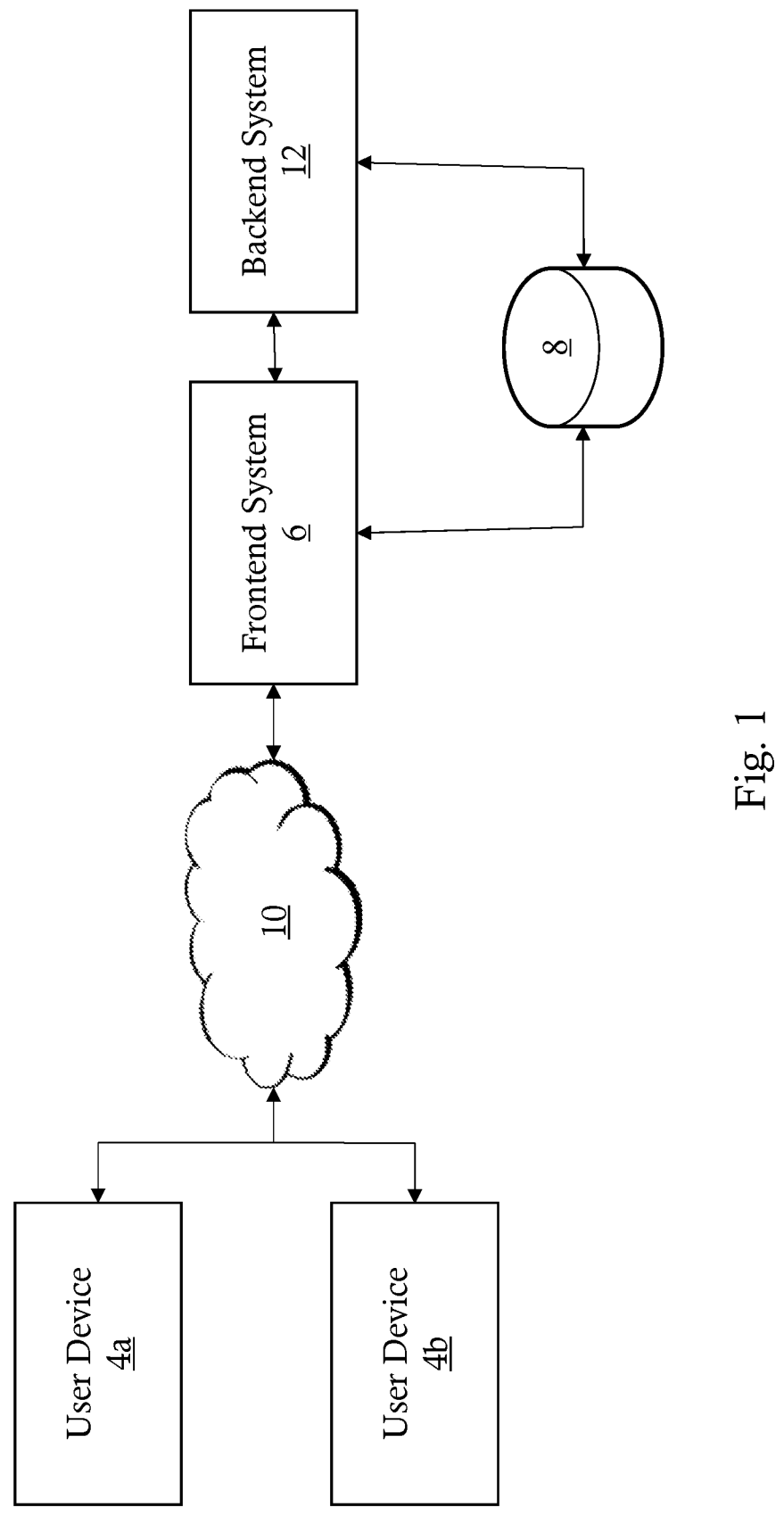
FIG. 1 illustrates a network system configured to provide a service intelligence platform, in accordance with some embodiments.

FIG. 1 illustrates a network environment 2 configured to provide an intelligence service platform, in accordance with some embodiments. The network environment 2 includes a plurality of user systems 4a, 4b in signal communication with a frontend system 6. The systems of the network environment, such as the user systems 4a, 4b, and/or the frontend system 6 can be in signal communication via one or more intervening networks or systems, illustrates as network cloud 10. It will be appreciated that any illustrated connection to the network cloud 10 can be replaced with a direct connection and/or any illustrated direction connection can be replaced with a connection to the network cloud 10.

The user systems 4a, 4b interact with a network interface provided by the frontend system 6. The user systems 4a, 4b can access one or more applications provided by and/or accessed through the frontend system 6. For example, in some embodiments, the user systems 4a, 4b access an intelligence service system configured to provide knowledge base searching and service ticket resolution, in accordance with the disclosed embodiments. The frontend system 6 can provide an interface configured to receive an input, such as a natural language input or machine log input. When a natural language input is received, the input is processed, either by the frontend system 6 and/or by a separate knowledge base system, and the processed input is compared to a database to identify historical data elements (e.g., service tickets, machine logs, etc.) having similar descriptions or input. After identifying similar records, tags, such as correction tags or part replacement tags, can be obtained for the identified historical data elements. As discussed in greater detail below, the correction tags can be pre-generated by a natural language processing system based on a set of known errors and associated resolutions.

The frontend system 6 can search a database 8 containing service tickets that have been previously associated with one or more correction tags and/or machine log codes. Service tickets having matching correction tags and/or machine log codes to those extracted from the input are identified and the corrective actions taken to resolve those service tickets are compiled. The frontend system 6 provides a list of the identified corrective actions in a ranked order to the user system 4a, 4b. The list of identified corrective actions can be ranked, for example, in descending order from the most-frequent resolution (e.g., most frequent occurrence, most-frequently identified as resolution, etc.) to the nth least-frequent resolution in the historical (e.g., tagged) data. The number of resolutions identified can be selected based on any suitable criteria, such as, for example, system preferences, number of potential resolutions, type of error, etc.

In some embodiments, the list of identified corrective actions can include software and/or hardware corrections. For example, corrective actions for a selected corrective tag or tags can include both potential software fixes (e.g., resetting the system, updating drivers, installing updated applications, etc.) and/or potential hardware fixes (e.g., replacing components, updating components, etc.). The service intelligence system can be configured to provide the software corrective actions separate from and/or integrated with the hardware corrective actions. For example, in some embodiments, a set of software corrective actions can be ranked in a first list and a set of hardware corrective actions can be ranked in a second list. The separate lists can be provided to the user simultaneously and/or depending on additional criteria.

In some embodiments, the network environment 2 includes a backend system 12 configured to performed backend processing including, for example, natural language processing tasks. The backend system 12 can be configured to process database records including service tickets and/or machine logs associated with corrective actions to generate or extract correction tags, sort the database records by correction tags, associate alternative correction tags with existing tickets, and/or otherwise extract error information from the service tickets and/or machine logs. The backend system 12 can be configured, additionally or alternatively, to identify or extract correction information associated with service tickets and/or machine logs.

In some embodiments, the backend system 12 is configured to associate machine logs with corrections based on tags and/or other extracted data. For example, the backend system 12 can be configured to extract or generate one or more tags for each service ticket in a database (e.g., a set of service tickets). For each service ticket, the backend system 12 extracts the tags and associates a corrective action that corrected the error identified in the ticket with the extracted tag(s). In addition, the backend system 12 can extract machine log identifiers from service tickets having identical or similar tags and associate the extracted machine log(s) with the tags and/or corrective actions, allowing users to search for both natural language errors and machine logs to identify corrective actions.

In some embodiments, the backend system 12 is configured to maintain the database 8 of service tickets each having at least one corrective action associated with the service ticket and at least one tag. The backend system 12 can access service tickets added to the database, for example, by a separate service ticket generation system (not shown) and apply one or more natural language processes to identify an error description, identify one or more corrective actions, and identify or generate one or more tags for the service ticket. The service ticket is updated with the identified tags, allowing the corrective action(s) of the service ticket to be identified in future knowledge base searches.

In some embodiments, the backend system 12 can perform real-time summarization and/or offline extraction for received natural language queries and/or service tickets. For example, the natural language processing system 12 can be configured to perform offline batch-processing of service tickets added to a database over a predetermined period, such as the last 24 hours, last 3 days, last week, etc. The natural language processing system 12 can process the set of service tickets added in the defined time window to extract/ identify tags, associated resolutions, and associated machine logs/codes. The backend system 12 can updated the database at periodic intervals to add processed service tickets. When a search query is received, the backend system 12 can perform real-time summarization of the search query and the corrective actions associated with those tags. The summarized information can be provided in a ranked list to the user. Real-time summarization ensures that the user receives the most-updated corrective actions available in the database.

Figure 2:
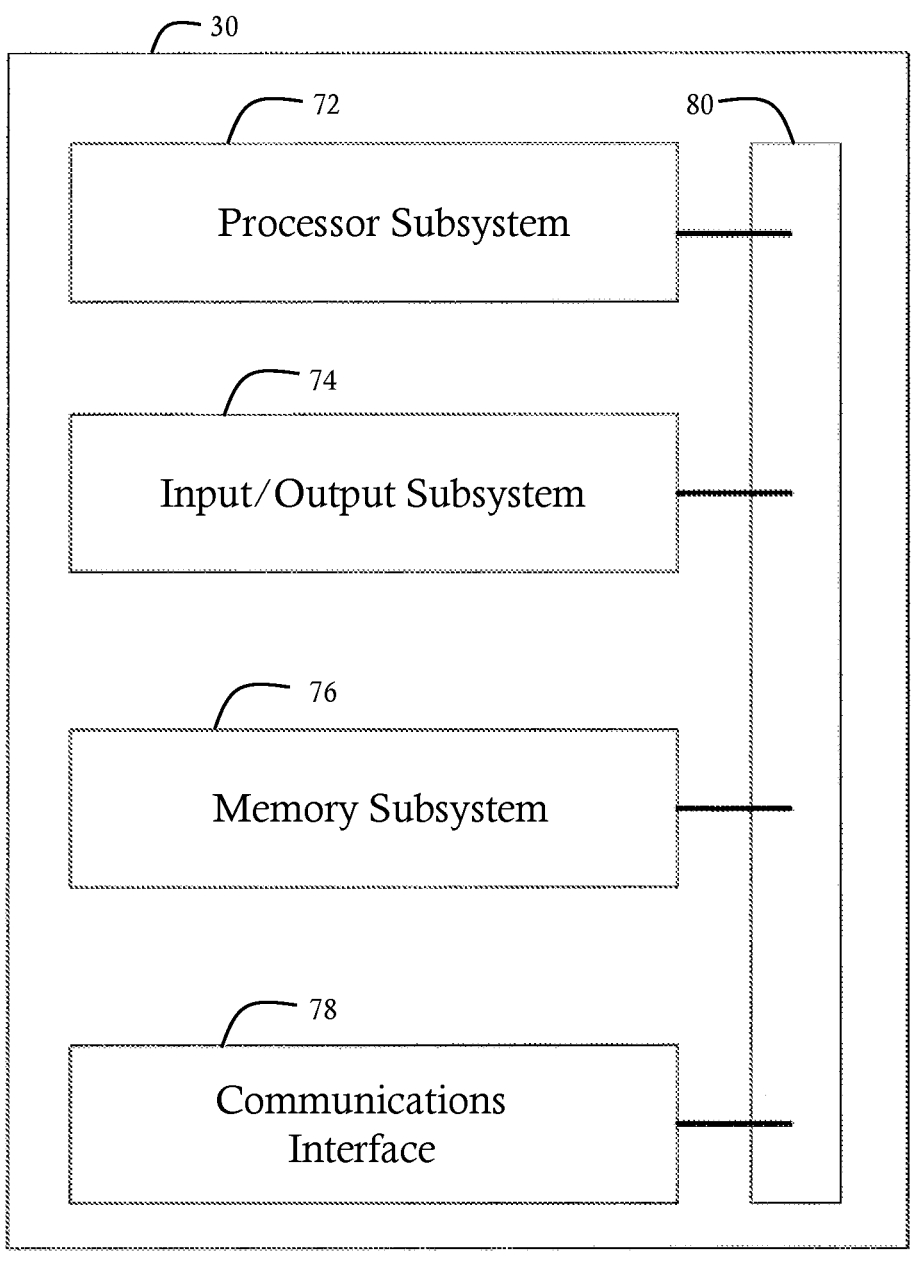
FIG. 2 illustrates a computer system configured to implement one or more processes, in accordance with some embodiments.

FIG. 2 illustrates a computer system 30 configured to implement one or more processes, in accordance with some embodiments. The system 30 is a representative device and can include a processor subsystem 72, an input/output subsystem 74, a memory subsystem 76, a communications interface 78, and a system bus 80. In some embodiments, one or more than one of the system 30 components can be combined or omitted such as, for example, not including an input/output subsystem 74. In some embodiments, the system 30 can comprise other components not shown in FIG. 2. For example, the system 30 can also include, for example, a power subsystem. In other embodiments, the system 30 can include several instances of a component shown in FIG.

2. For example, the system 30 can include multiple memory subsystems 76. For the sake of conciseness and clarity, and not limitation, one of each component is shown in FIG. 2.

The processor subsystem 72 can include any processing circuitry operative to control the operations and performance of the system 30. In various aspects, the processor subsystem 72 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 72 also can be implemented by a controller, a microcontroller, an application specific integrated circuit (ASIC), a field programmable gate array (FPGA), a programmable logic device (PLD), and so forth.

In various aspects, the processor subsystem 72 can be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 30 can include a system bus 80 that couples various system components including the processing subsystem 72, the input/output subsystem 74, and the memory subsystem 76. The system bus 80 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 74 can include any suitable mechanism or component to enable a user to provide input to system 30 and the system 30 to provide output to the user. For example, the input/output subsystem 74 can include any suitable input mechanism, including but not limited to, a button, keypad, keyboard, click wheel, touch screen, motion sensor, microphone, camera, etc.

In some embodiments, the input/output subsystem 74 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 30. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 72. For example, the visual peripheral output device can be able to play media playback information, application screens for application implemented on the system 30, information regarding ongoing communications operations, information regarding incoming communications requests, or device operation screens, to name only a few.

In some embodiments, the communications interface 78 can include any suitable hardware, software, or combination of hardware and software that is capable of coupling the system 30 to one or more networks and/or additional devices. The communications interface 78 can be arranged to operate with any suitable technique for controlling information signals using a desired set of communications protocols, services or operating procedures. The communications interface 78 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 78 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 78 can include a wireless interface comprising one or more antennas, transmitters, receivers, transceivers, amplifiers, filters, control logic, and so forth.

In various aspects, the communications interface 78 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 76.

In some embodiments, the memory subsystem 76 can include any machine-readable or computer-readable media capable of storing data, including both volatile/non-volatile memory and removable/non-removable memory. The memory subsystem 76 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 30.

In various aspects, the memory subsystem 76 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-ni-tride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 76 can con-tain an instruction set, in the form of a file for executing various methods, such as methods including executing an service intelligence platform, as described herein. The instruction set can be stored in any acceptable form of machine readable instructions, including source code or various appropriate programming languages. Some examples of programming languages that can be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 72.

Each functional component described herein can be implemented in computer hardware, in program code, and/or in one or more computing systems executing such program code as is known in the art. As discussed above with respect to FIG. 2, such a computing system can include one or more processing units which execute processor-executable pro-gram code stored in a memory system. Similarly, each of the disclosed methods and other processes described herein can be executed using any suitable combination of hardware and software. Software program code embodying these pro-cesses can be stored by any non-transitory tangible medium, as discussed above with respect to FIG. 2.

The disclosed systems and methods utilize, in part, NLP models to perform certain processing. NLP can be per-formed by statistical models and/or neural language models. Neural language models are a type of machine learning directed to detecting, parsing, understanding, and processing language input, such as speech or textual input. In general, for machine learning tasks, a trained function mimics cog-nitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted itera-tively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

Figure 3:
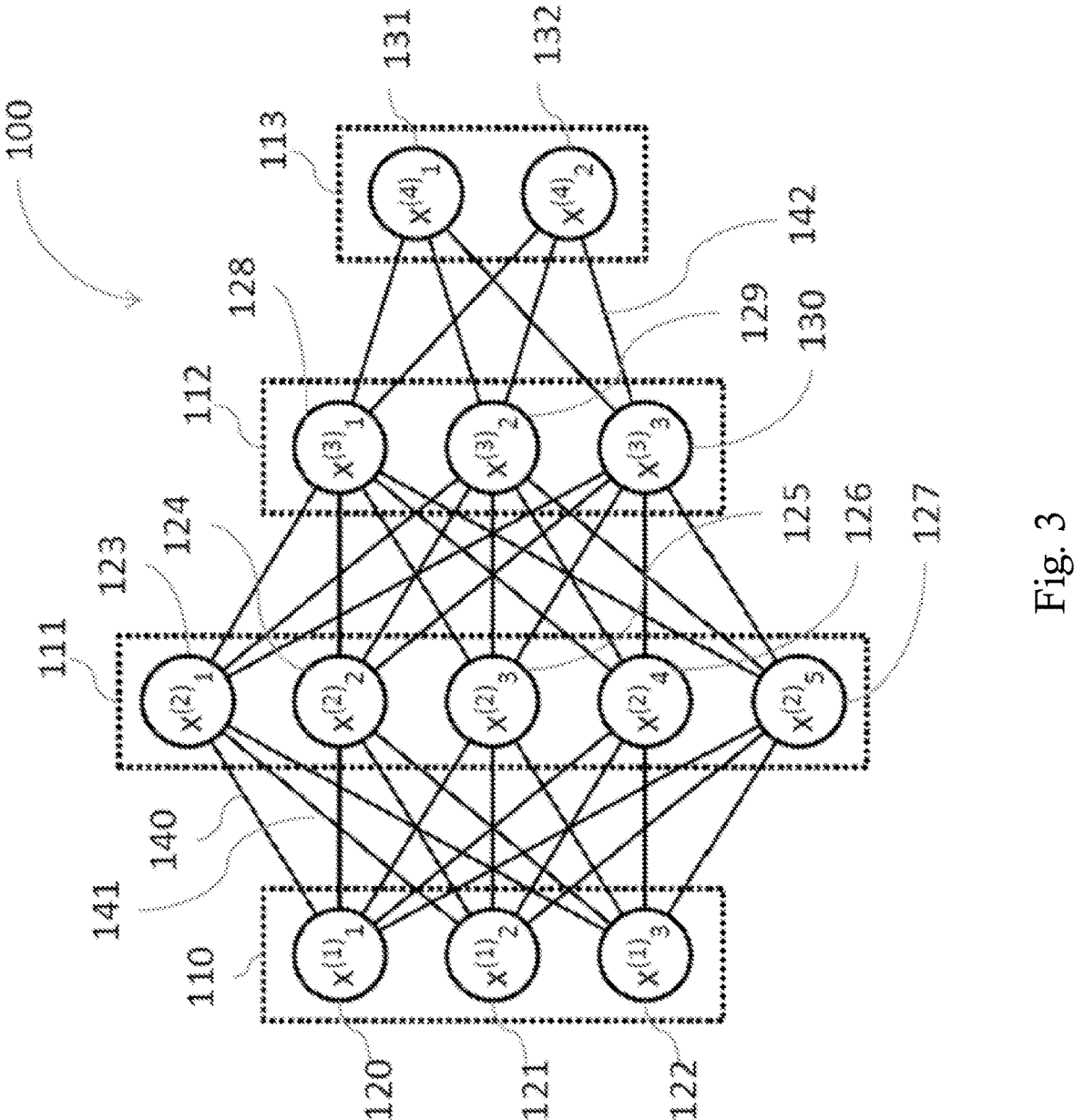
FIG. 3 illustrates an embodiment of an artificial neural network, in accordance with some embodiments.

FIG. 3 illustrates an embodiment of an artificial neural network 100, in accordance with some embodiments. Alter-native terms for "artificial neural network" are "neural network," "artificial neural net," "neural net," or "trained function." The artificial neural network 100 comprises nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 2 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "out-going edge" for the first node 120-132.

In this embodiment, the nodes 120-132 of the artificial neural network 100 can be arranged in layers 110-113, wherein the layers can comprise an intrinsic order intro-duced by the edges 140-142 between the nodes 120-132. In particular, edges 140-142 can exist only between neighbor-ing layers of nodes. In the displayed embodiment, there is an input layer 110 comprising only nodes 120-122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120-122 within the input layer 110 usually relates to the number of input values of the neural network, and the number of nodes 131, 132 within the output layer 113 usually relates to the number of output values of the neural network.

In particular, a (real) number can be assigned as a value to every node 120-132 of the neural network 100. Here, $x^{(n)}_i$ denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 120-132 of the m-th layer 110-113 and the j-th node 120-132 of the n-th layer 110-113. Furthermore, the abbreviation $w^{(n)}_{i,j}$ is defined for the weight $w^{(n, n+1)}_{i,j}$.

In particular, to calculate the output values of the neural network 100, the input values are propagated through the neural network. In particular, the values of the nodes 120-132 of the (n+1)-th layer 110-113 can be calculated based on the values of the nodes 120-132 of the n-th layer 110-113 by $$x_j^{(n+1)} = f(\Sigma_i x_i^{(n)} \cdot w_{i,j}^{(n)})$$

Herein, the function f is a transfer function (another term is "activation function"). Known transfer functions are step functions, sigmoid function (e.g. the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values $w^{(m,n)}_{i,j}$ for the edges, the neural network 100 has to be trained using training data. In particular, training data comprises training input data and training output data (denoted as $t_i$). For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'_{i,j}{}^{(n)} = w_{i,j}{}^{(n)} - \gamma \cdot \delta_j{}^{(n)} \cdot x_i{}^{(n)}$$

wherein $\gamma$ is a learning rate, and the numbers $\delta^{(n)}{}_j$ can be recursively calculated as $$\delta_j{}^{(n)} = (\Sigma_k \delta_k{}^{(n+1)} \cdot w_{j,k}{}^{(n+1)} \cdot f'(\Sigma_i x_i{}^{(n)} \cdot w_{i,j}{}^{(n)})$$

based on $\delta^{(n+1)}{}_j$, if the (n+1)-th layer is not the output layer, and $$\delta_j{}^{(n)} = (x_k{}^{(n+1)} - t_j{}^{(n+1)}) \cdot f'(\Sigma_i x_i{}^{(n)} \cdot w_{i,j}{}^{(n)})$$

if the (n+1)-th layer is the output layer 113, wherein f' is the first derivative of the activation function, and $y^{(n+1)}{}_j$ is the comparison training value for the j-th node of the output layer 113.

Figure 4:
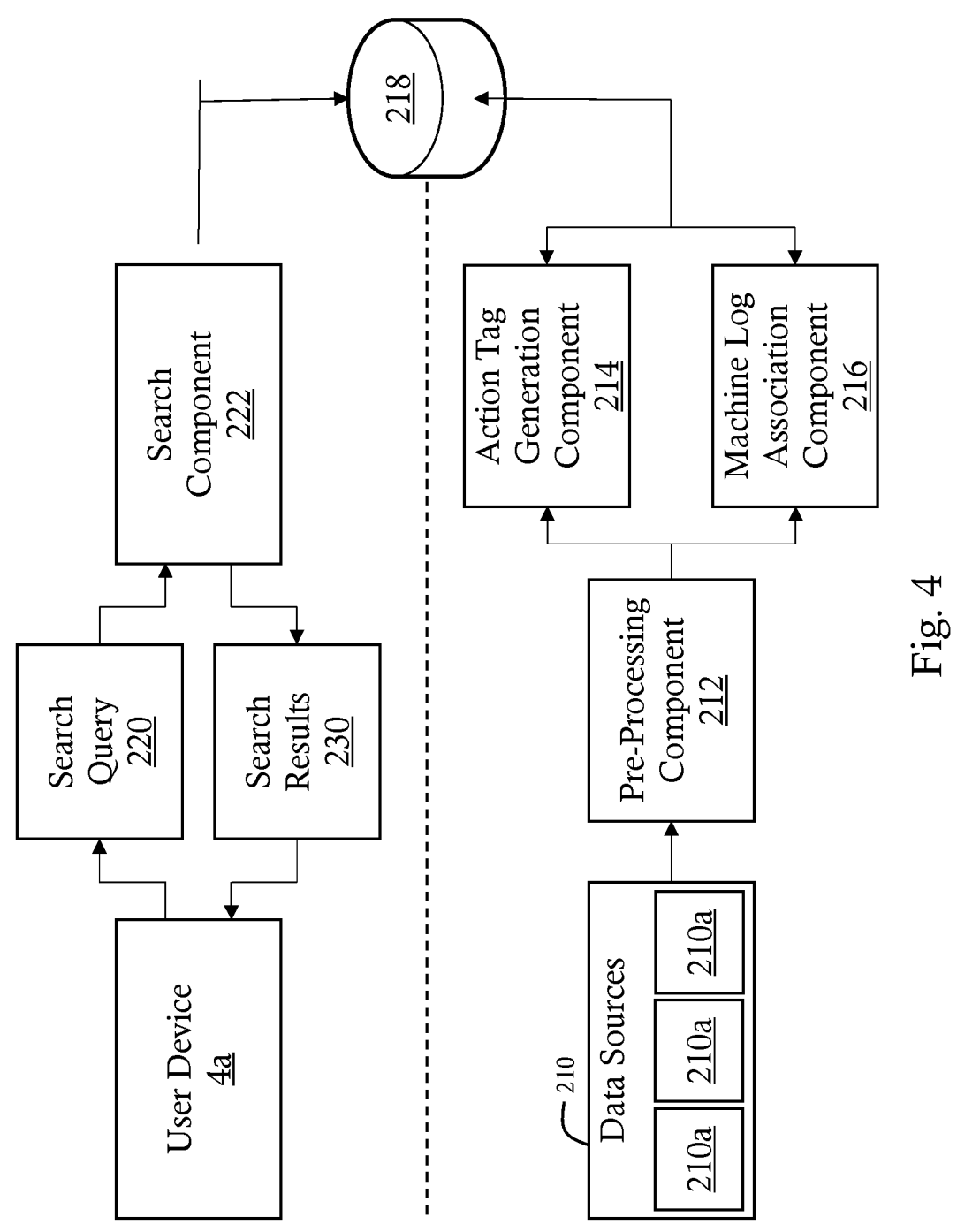
FIG. 4 is a process flow illustrating frontend and backend flow of a service intelligence platform, in accordance with some embodiments.

FIG. 4 is a process flow illustrating backend flow 202 and frontend flow 204 of a service intelligence platform 200, in accordance with some embodiments. Although the service intelligence platform 200 is divided into backend flow 202 and frontend flow 204 for the purposes of this description, it will be appreciated that the various components and/or processes described in the backend flow 202 can be implemented and/or utilized by the frontend flow 204, and the opposite is also true. It will also be appreciated that the delineation between backend flow 202 and frontend flow 204 can be eliminated and the service intelligence platform considered as a single flow.

In some embodiments, the backend flow 202 includes a sequential pipeline that starts with input data received from one or more input data sources 210. In the illustrated embodiment, the input data sources 210 include a service ticket database 210*a*, a machine log database 210*b*, and a system parts database 210*c*. Although specific input data sources 210 are discussed herein, it will be appreciated that the input data sources can include one or more of any of the illustrated sources and/or additional or alternative data sources. Although the backend flow 202 is illustrates a sequential pipeline, it will be appreciated that any of the disclosed elements can be bypassed and/or removed and/or other components not illustrated can be added.

Data elements from the input data sources 210 are provided to a pre-processing component 212. The data elements provided from the input data sources 210 can include, for example, service tickets, machine logs, system part identifiers or lists, predefined tags with associated corrective actions, expert identified corrective actions, and/or any other suitable data. The pre-processing component 212 is configured to receive each of the data elements from the data sources 210 and prepare the data elements for processing, such as natural language processing, statistical processing, etc. The pre-processing component 212 can include one or more pre-processing processes, such as, for example, a data cleaning process, a data merge process, a data manipulation process, and/or any other suitable pre-processing functions. It will be appreciated that any suitable, pre-processing process can be applied to the data elements received from the data sources 210.

The pre-processed data elements are provided to an action tag generation process 214. The action tag generation process is configured to extract information from the preprocessed data elements, such as service tickets, and generate tags for use in identification of most-likely corrective actions and/or part replacements for an identified service issue, as discussed in greater detail below. In some embodiments, the action tag generation process 214 utilizes one or more NLP components to perform information extraction. For example, in some embodiments, the action tag generation process 214 is configured to perform information extraction and/or text clustering processes. In some embodiments, information extraction can include, but is not limited to, segmentation, such as service ticket segmentation, machine code segmentation, etc. and/or part of speech tagging.

Segmentation models can include, but are not limited to, supervised models (e.g., LSTM, BERT, transformer-based models), unsupervised models utilizing lexical cohesion, topic modeling, graphing, similarity measurements, or other unsupervised techniques (e.g., TextTiling, LCseg, TopicTiling, GraphSeg, Cosine Similarity, etc.), statistical models, and/or any other suitable segmentation models. Similarly, part of speech tagging can be performed by any suitable supervised, unsupervised, or statistical model, such as those utilizing Markov chains, Hidden Markov Models, and/or any other suitable part of speech tagging process. In addition, clustering can be provided by any suitable supervised, unsupervised, or statistical clustering model, such as a hard clustering model, a soft clustering model, a hierarchical clustering model, a k-means model, a Brown clustering model, etc. It will be appreciated that specifically identified models and/or techniques are provided as examples, and any suitable models for segmentation, part of speech tagging, clustering, and/or any other NLP process can be implemented.

As one non-limiting example, the action tag generation process 214 can be configured to receive an input from a service ticket stating "Work Performed—Lubricated Detector 2 1-arm and cleaned oil from detector 2 sld cover." This ticket can be processed by the action tag generation process 214, which extracts or generates two tags for the ticket—"lubricate detector" and "clean oil." These tags correspond to corrective actions that were taken in conjunction with successfully correcting an issue. In some embodiments, the issue can additionally be identified in the service ticket and/or can otherwise be associated with the identified solution. Other tags related to identified errors, service issues, corrective steps, parts replacement, and/or any other relevant portion of a service ticket can be extracted by the action tag generation process 214.

In some embodiments, a first portion of data in a service ticket can be provided for action tag generation and a second portion of data can be provided for separate processing, such as, for example, natural language indexing. For example, in some embodiments, a first portion of data corresponding to corrective actions, e.g., steps taken by a system, technician, user, etc. that led to resolution of an issue. Corrective actions can be identified by one or more phrases, e.g., "work performed," "correction," "action taken," etc., and/or can be identified using semantic, domain, textual, and/or other NLP processes. The corrective actions can be provided to the action tag generation process 214 to generate one or more corrective tags that are associated with the corrective actions and/or the encountered issues.

In some embodiments, the action tag generation process 214 is configured to identify different types of tags corresponding to different types of actions. For example, in some embodiments, the action tag generation process 214 differentiates between actions that are performed without part replacement ("corrective actions") and replacement of defective parts ("part replacement"). If an action identified by the action tag generation process 214 indicates a part replacement, e.g., "Action performed—replaced video card," the tag and corresponding action are classified by a part replacement tag. If an action indicates a corrective action, e.g., "Action performed—Updated video drivers," the tag and action are classified by a corrective action tag. As discussed below with respect to the frontend flow 204, the service intelligence platform 200 can be configured to provide corrective actions and part replacements separately and/or in conjunction when providing a list of corrective actions for an identified issue.

In some embodiments, the action tag generation process 214 is configured to cluster tags having similar meanings. For example, in some embodiments, a set of tags including "verify OEM power supply voltage," "verity OEM power supply," "verify OEM detector power supply," "check OEM power supply," and "check OEM pwr supply," each of which can be extracted from one or more service tickets, are merged to form a single tag, such as, for example, "check OEM power supply." Clustering of tags allows related tags to be easily combined into a single reference tag to ensure that each service tag having a similar corrective action or part replacement are referenced and produced in response to a search that identifies one of the clustered tags.

Figure 5:
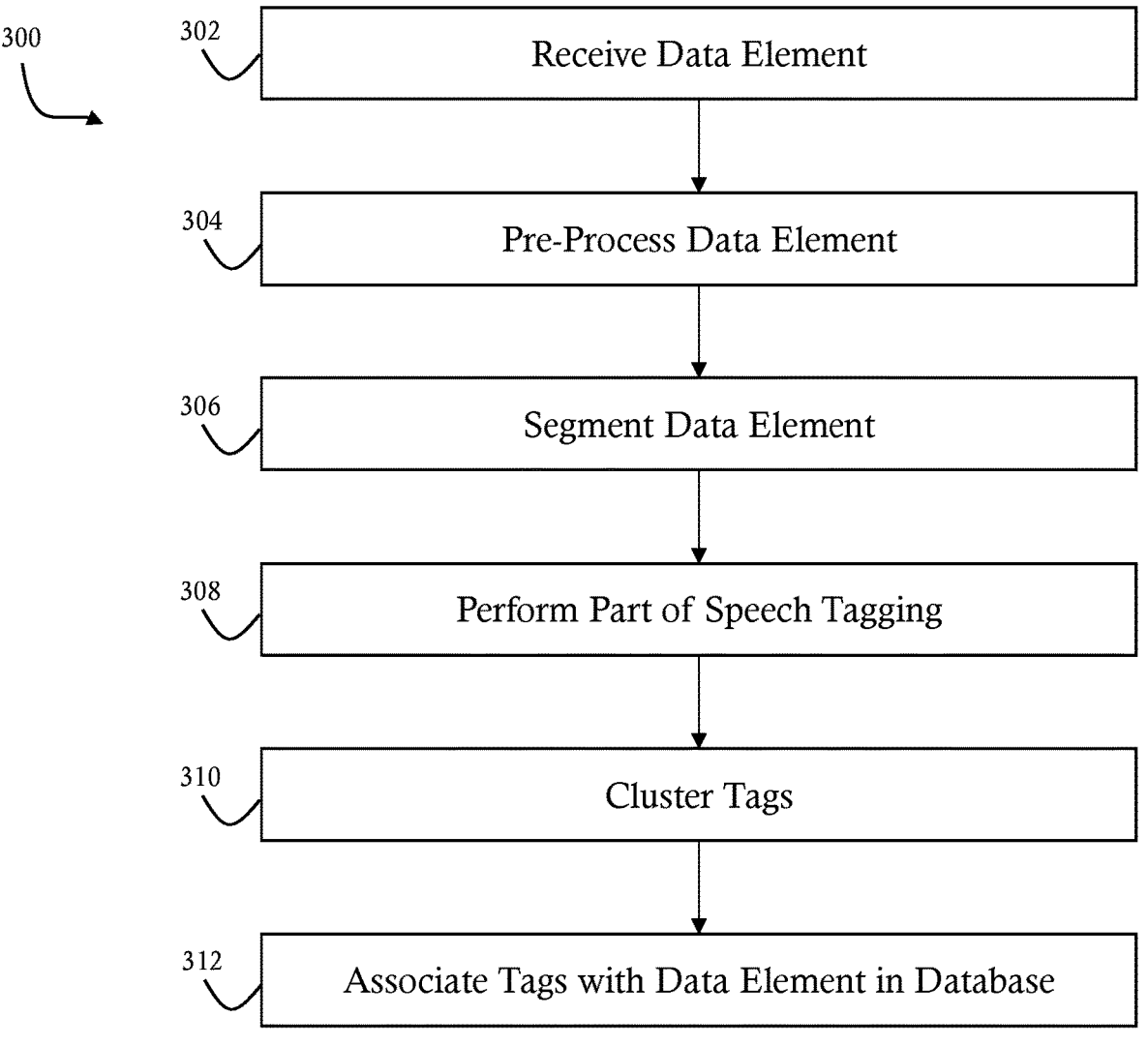
FIG. 5 is a flowchart illustrating a method of generating tags for use by a service intelligence platform, in accordance with some embodiments.

FIG. 5 is a flowchart illustrating a method 300 of generating tags for use by a service intelligence platform 200, in accordance with some embodiments. At step 302, a data element, such as a service ticket, a machine log, or a system part replacement report, is received. As discussed above, any suitable data element can be processed to generate corrective action tags and/or part replacement tags. At step 304, the received data element is pre-processed. As previously discussed, pre-processing can include, but is not limited to, data cleaning, data merging, and/or data manipulation.

At step 306, the received data element is segmented to identify different portions of the data element. For example, a service ticket can be segmented to identify a description of an error or service issue encountered, one or more attempted resolutions, one or more actual resolutions, one or more part identifiers, one or more part replacements, etc. In some embodiments, the segmentation process is configured to identify predetermined portions of the data element, such as an error description, a resolution, and a part for each service ticket. In some instances, a data element can omit one or more expected or predetermined portions. In other embodiments, segmentation can be performed to identify individual words, concepts, and/or other semantic or non-semantic elements within the data elements. For example, in some embodiments, segmentation can be performed to identify each word or machine log code in a received data element.

At step 308, part of speech tagging can be performed for a relevant segmented portion of the data element. For example, in some embodiments, part of speech tagging can be performed only on a portion of a service ticket segmented as a resolution. As another example, in some embodiments, part of speech tagging can be performed for each word identified during a segmentation step 306. Part of speech tagging categorizes words in the data element into a particular part of speech, e.g., noun, verb, adjective, etc., based on one or more elements, such as the definition of the word and the surrounding context in the text.

In some embodiments, the tagged parts of speech are used to extract corrective tags, part replacement tags, and/or machine codes from the data element. For example, in some embodiments, a corrective tag can be defined as a collection of specific semantic elements, e.g., parts of speech, that follow or are related to a specific term or other part of speech, such as one or more nouns, verbs, or adjectives that are in the same sentence as the term "work performed." As another example, in some embodiments, hardware components can be identified based on matching of semantic elements, e.g., matching of nouns, and actions performed, e.g., verbs, such as "video card replaced," which identifies a noun, "video card," and a verb, "replaced." It will be appreciated that generation of the specific tags can be performed using any suitable tag generation process and any suitable matching of semantic elements.

In some embodiments, extracted text is compared to a set of known machine logs or codes to determine whether the text is a machine log or code. Text matching can be performed between extracted values, e.g., suspected machine logs, and a database or list of known values, e.g., known machine logs, to determine if a match is present. If a match is found, the extracted text is identified as a machine log and tags generated for the data element can be associated with the extracted machine log value.

At step 310, the extracted tags can be clustered using one or more clustering processes. For example, as discussed above, a set of tags including "verify OEM power supply voltage," "verity OEM power supply," "verify OEM detector power supply," "check OEM power supply," and "check OEM pwr supply," each of which can be extracted from one or more service tickets, can be merged to form a single tag, such as, for example, "check OEM power supply." As another example, extracted tags having similar part replacements, such as "trinity detector," "trinity det," "trnty dtcr," etc. can be clustered in a single tag, such as "trinity detector."

At step 312, generated tags are associated with the data element and stored in a database. The tags can be stored in conjunction with and/or separately from the data element. In some embodiments, prior to storing the tags, a check is performed to see if identical and/or similar tags have been previously generated. In some embodiments, the generated tags can be clustered with pre-existing tags prior to being stored in the database.

Figure 6:
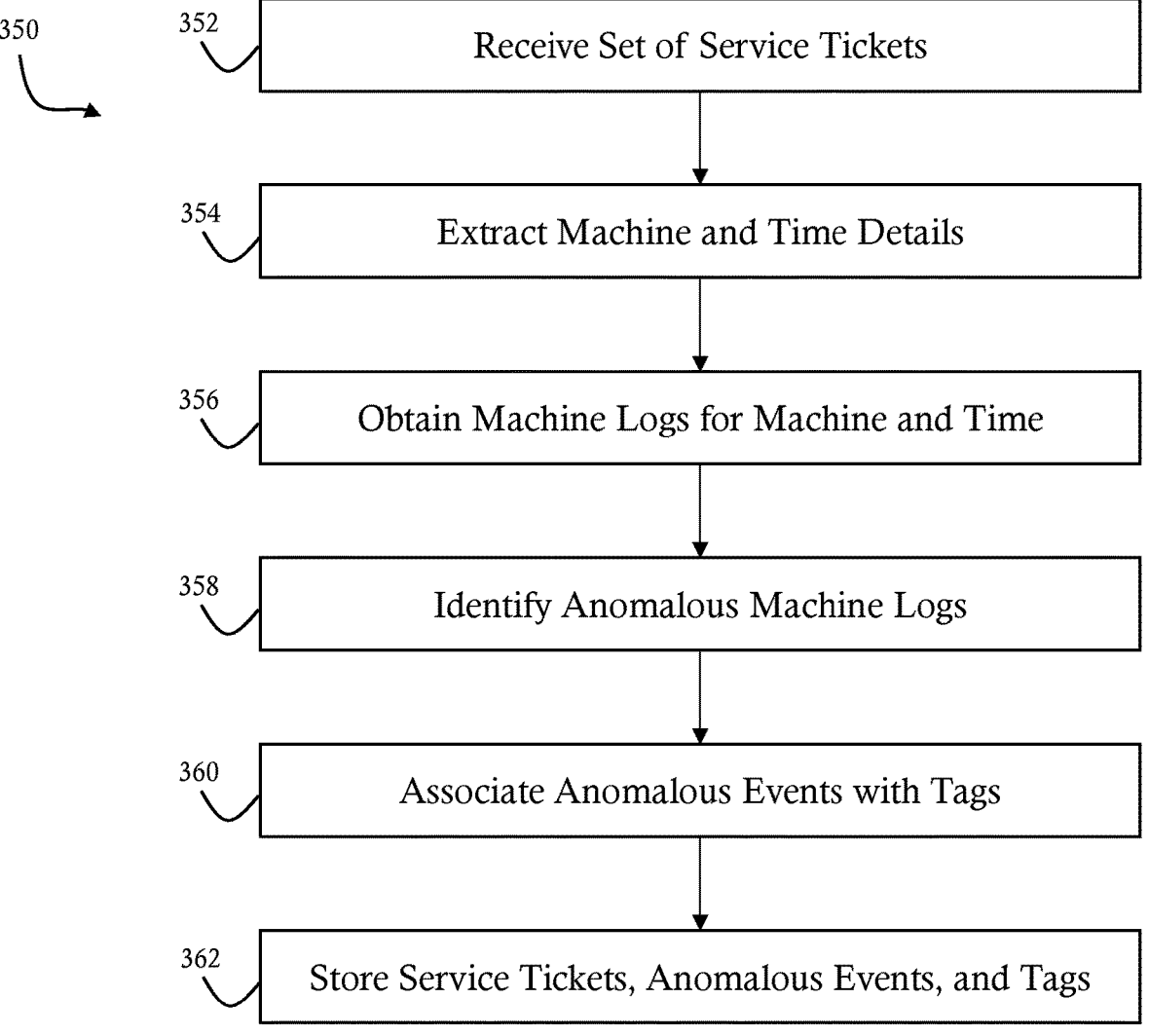
FIG. 6 is a flowchart illustrating a method of creating a database of anomalous events mapped with corrective actions, in accordance with some embodiments.

With reference again to FIG. 4, in some embodiments, machine log data (e.g., machine logs, machine codes, etc.) can be associated with one or more generated tags and subsequently provided as an input to a search component and used as part of a search query, as discussed in greater detail below. In some embodiments, a machine log association component 216 is configured to map one or more machine events (e.g., machine logs, machine codes, event codes, etc.) to one or more of the tags generated by the action tag generation component 214. FIG. 6 is a flowchart 350 illustrating a method of creating a database of anomalous events mapped with tags and the underlying corrective actions and/or part replacements, in accordance with some embodiments. At step 352, a set of service tickets, each having at least one corrective action, is received. As discussed above, service ticket data can be received from a service ticket data source 210a and/or any other suitable data source. The method of creating a database of anomalous events can be performed simultaneously and/or sequentially with other methods discussed herein that receive service ticket data, such as, for example, action tag generation, as discussed above.

At step 354, machine and time details are extracted from each of the service tickets in the set of service tickets. For example, in some embodiments, each service ticket can include one or more fields identifying the machine related to the service ticket and a relevant time period, such as the time of the error/issue, the time the ticket was created, etc. In some embodiments, machine data and/or time data can be extracted from narrative text in the service ticket using one or more NLP processes, for example, as discussed above regarding tag generation.

At step 356, machine logs for a predetermined period before, during, and/or after a time period determined by the identified time data can be obtained from the identified machine. For example, relevant machine logs can include all machine logs that were generated within a predetermined period prior to an error occurring or service ticket being generated, all machine logs generated within a predetermined period after an error occurred or a service ticket was generated, and/or any other relevant time period.

At step 358, the machine logs are filtered to identify only anomalous machine logs, e.g., machine logs that are not typical and that are indicative of one or more errors in a machine. Filtering of machine logs to identify anomalous machine logs can be performed using any suitable process. For example, in some embodiments, a process identifies baseline machine logs for a machine by generating event IDs associated with event records, identifying normal events for the machine (and/or associated machines), and identifying a probability of occurrence for an event based on the event ID. A risk category determination can be made for each event ID, with certain risk categories being identified as anomalous events. U.S. patent application Ser. No. 17/062,189, entitled "Method and System for Determining Root Cause of Anomalous Events," which includes a description of anomalous machine log detection, is incorporated herein by reference in its entirety.

At step 360, anomalous events identified for the machine within the relevant time period are associated with (e.g., mapped to) the corrective action tags (or the underlying corrective actions) and/or part replacement tags (or the underlying replaced parts) in a database. As discussed above, in some embodiments, machine logs can be provided as part of a search query, either manually and/or automatically, and used to identify relevant tags, corrective actions, and/or part replacements. For example, at step 362, each of the service tickets, the identified tags, and the identified anomalous events can be stored in a database, such as database 218.

With reference again to FIG. 4, after processing, the data elements received from the data sources 210 are indexed and stored in a search database 218. The search database 218 is configured to allow full text searching of the data elements, such as, for example, full text searching of service tickets, matching of machine logs/codes, and/or any other suitable search. The search database 218 includes the tags identified for each data element and the corrective actions or part replacements that are associated with specific tags. As discussed below, when a search query is received through the frontend flow 204, the database 218 is searched to identify service tickets having similar issues (based on natural language searching) or similar machine codes (based on machine code matching), the tags associated with the identified service tickets are retrieved, and the corrective action and/or the part replacement associated with the identified tags are provided in response to the search query.

In some embodiments, a frontend flow 204 of the service intelligence system 200 includes a search and summarization technique. A user system 4a generates a search query 220. The search query 220 can include a natural language description of an error or other issue encountered. Examples of natural language search queries include, but are not limited to, "quality check failed," "power issue," "blue screen," etc. The search query 220 can, alternatively or additionally, include one or more machine codes or log events that were generated in response to and/or during an encountered issue. Machine codes can take any form, including non-human readable form, such as, for example, a code designating "PET_QC 328."

In some embodiments, the search query 220 is provided to a search component 222. The search component 222 is configured to perform natural language and/or machine code-based searching. The search component 222 can be configured to implement any suitable NLP processes for natural language searching, such as, for example, filtering processes, auto-detection processes, summarization processes, and/or any other suitable processes. In some embodiments, the search component 222 is configured to identify machine logs or codes and perform searching using the machine logs or codes.

The search component 222 can be configured to implement a search and summarization technique to perform a search on indexed data in the database 218 and summarize the results. The summarization can include aggregation of the tags generated by the backend process (as discussed in above), although it will be appreciated that any suitable summarization process can be used. The search component 222 can include a search optimization process to improve search results and speed. As discussed in greater detail below, search optimization can include, but is not limited to, statistical filtering and/or domain filtering.

Figure 7:
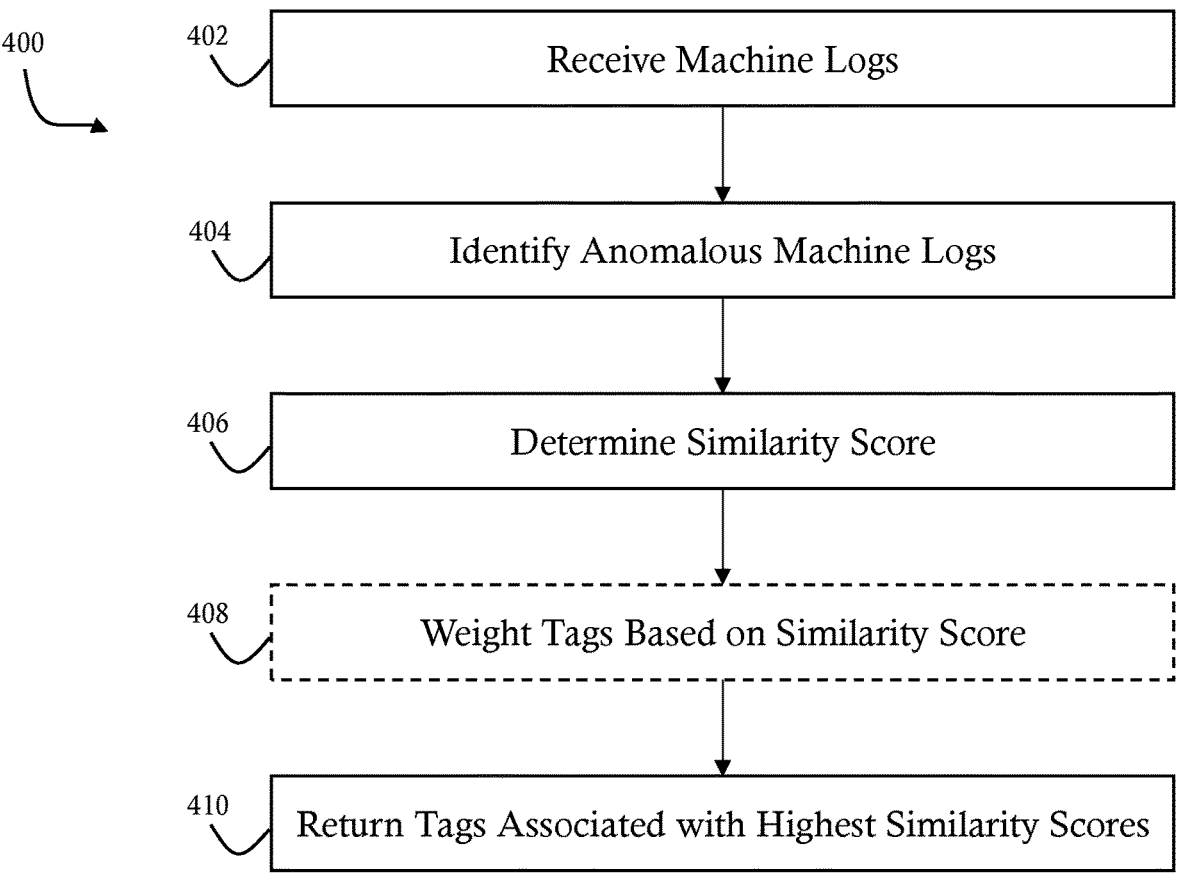
FIG. 7 is a flowchart illustrating a method of identifying corrective actions and/or part replacements based on machine logs, in accordance with some embodiments.

In some embodiments, the search component 222 is configured to identify corrective actions and/or part replacements based on machine log data. FIG. 7 is a flowchart 400 illustrating a method of identifying corrective actions and/or part replacements based on machine logs, in accordance with some embodiments. At step 402, machine logs for a machine associated with an error are received. For example, a search query 220 can include machine log data and/or identification of machine logs provided in the initial search query. As another example, the search component 222 can be configured to extract a machine identifier from the search query 220 and retrieve machine logs from the identified machine using an automated process. The machine identifier can be extracted from the search query 220 using any of the NLP processing steps discussed above, such as, for example, segmentation and/or part of speech identification. In addition or in the alternative, the machine identifier can be provided as an input field or text input in the initial search query. In some embodiments, the machine logs associated with the machine can be received for a predetermined time period, such as a predetermined time period before, during, and/or after the identified error.

At step 404, the received machine logs are filtered to identify anomalous log events and, at step 406, the identified anomalous events are compared to anomalous events in historical service tickets to determine a similarity score. As discussed in greater detail below, anomalous log events can be generated by a process that identifies a baseline for a machine (or set of machines) and identifies non-normal events for the machine.

At step 406, a similarity score is determined based on matching between each anomalous event identified in the machine logs of a machine associated with the current search query 220 and historical service information. The similarity score can include a value between 0 and 1 based on the number of anomalous events of the current search query 220 that match with anomalous events in historical service tickets. For example, in some embodiments, the anomalous events identified in the machine logs associated with the current search query 220 are compared with every service ticket in the database 218. For each anomalous event or machine log shared between the current search query 220 and a historical service ticket, the similarity score can be increased by a predetermined value. For example, if ten (10) anomalous events are identified in the machine logs associated with the current search query 220, the similarity score between the current search query 220 and an existing service ticket in the database 218 can be increased at tenth increments (e.g., 0.1) for each anomalous event that is shared between the machine logs of the current search query 220 and the historical service ticket. In this example, if a service ticket matches all ten anomalous events, the similarity score would be 1, while if only a single anomalous event is shared, the similarity score would be 0.1. It will be appreciated that the similarity score can be calculated using any suitable incremental value and/or other method.

At optional step 408, the identified tags can be weighted based on similarity scores. For example, if a tag has a higher similarity score, the correction actions and/or part replacements associated with that tag will be ranked higher than tags having lower similarity scores in the search results. At step 410, tags associated with service tickets having a similarity score above a predetermined threshold are selected and the service tickets, tags, and associated correction actions and/or replacements parts are returned as search results. The predetermined threshold can be set at any suitable value, such as, for example, a similarity score of 0.5, 0.8, etc. In some embodiments, the service tickets having similarity scores above the predetermined threshold can be returned exclusively and/or in conjunction with service tickets identified using natural language processing, as discussed above.

With reference again to FIG. 4, after performing a search on the database 218, the search component 222 provides a set of search results 230 to the user device 4a that initiated the search query 220. The search results 230 present a ranked set of corrective actions and/or part replacements that are associated with the identified tags. In some embodiments, the service tickets identified in the search and/or associated with the identified tags are provided as part of the search results as well. The corrective actions and/or part replacements can be presented to a user in conjunction with information obtained from the associated service tickets.

In some embodiments, the search results 230 can be displayed on a user device based on one or more criteria, such as, for example, the ranking assigned by the search component 222. In some embodiments, the highest ranked corrective action can be displayed in a first position in a tile having a first size. Each of the subsequently ranked corrective actions can be displayed in secondary locations having decreased or decreasing size based on the ranking results of the search component 222. In some embodiments, the highest ranked part replacement can be displayed in a second location in a tile having a first size, with each of the subsequently ranked part replacements displayed in secondary locations having decreased or decreasing size based on the ranking results.

In some embodiments, additional information regarding the suggested course(s) of action can be provided to a user system for inclusion in a user display. For example, in some embodiments, service tickets, such as those service tickets having the highest similarity score with respect to the current search query, can be displayed in conjunction with one or more of corrective actions and/or part replacements.

As another example, in some embodiments, service knowledge base (SKB) information can be displayed in conjunction with one or more of corrective actions and/or part replacements. It will be appreciated that any suitable data can be displayed in conjunction with and/or in response to display of the search results 230.

The separation between the backend flow 202 and the frontend flow 204 allows the resource-intensive portions of the service intelligence system 200, such as service ticket processing, tag generation and clustering, or database updating, to be performed as a backend process. These backend processes can be scheduled or performed at predetermined intervals and/or during certain time periods, such as overnight, weekly, or monthly. Scheduling resource-intensive tasks for intervals and/or during certain time periods improves overall performance of the service intelligence system 200, allowing the frontend flow 204 to operate at a higher rate. In addition, generation of tags during backend processing 202 allows simple aggregation of tags during the frontend flow 204, providing faster execution and run-time for search queries.

Figure 8:
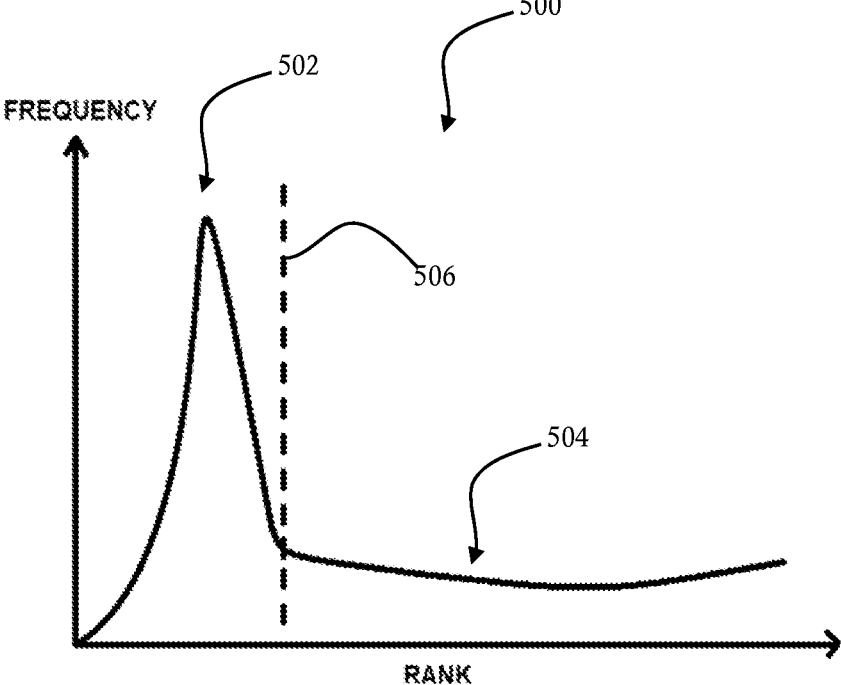
FIG. 8 is a chart illustrating statistical filter configured to improve accuracy of search results in a service intelligence platform, in accordance with some embodiments.

FIG. 8 illustrates a statistical filter configured to improve accuracy of search results in a service intelligence platform, in accordance with some embodiments. In typical full-text search systems, the output results for a text match includes ranked entries that can be unrelated to the actual search string. For example, in a typical system, an input of "ups failed" as a search string will produce matches for all searched elements including both words from the input text. In this example, any service ticket that contains either the word "ups" (e.g., uninterruptable power supply) or the word "failed" will be produced, irrespective of whether the reference to "ups" is in the context of a failure or the whether the reference to "failed" relates to the ups or power system. The frequency of a word, such as "failed," can be so high in a service domain that a search algorithm effectively ignores the term when searching.

As shown in distribution 500, search results for a term can be overcrowded with low-rank values having a high frequency, as shown by large curve 502 at the beginning of the distribution 500. These low-rank values add additional noise to search results, increasing search times and reducing search accuracy. In contrast, the tail portion 504 extending from the large curve 502 represents high-rank search results that occur with low frequency, e.g., highly accurate results that are targeted. In some embodiments, the service intelligence system 200 implements a statistical filter to exclude irrelevant search results by truncating a heavy tailed distribution, such as shown in FIG. 8. Truncation can be performed to eliminate the statistically insignificant, but highly frequent, search result in portion 502 while maintaining the high relevance search results found in portion 504, for example, by truncating the search results at position 506. It will be appreciated that any suitable truncation process can be used, such as, for example, Pareto and/or kernel density estimation, to segregate the noise (e.g., the first portion 402 of the distribution 400) from the main output (e.g., the second portion 404 of the distribution 400). As one example, if 80% of search results are located within a portion 402 representing only 20% of the rank, then 80% of the search results can be excluded from the search result set.

After removing the irrelevant noise, e.g., portion 402, by trimming the head of heavy tailed distribution 400, the overall accuracy of the search results and tag summarization are drastically improved. In addition, the use of truncated distributions provides for the removal of contextual stop-words. Stop-words are common words that do no produce significant search results and thus are typically removed or ignored during a search. Stop-words are typically stored in a dictionary and require dictionary matching with a search query to identify. As one example, prepositions, such as "the," are typically excluded stop words. In some instances, a term can be similar to a stop word but not included in a stop word list due to necessary context. For example, "fail" is a common word in service tickets data, but may not be part of stop-word list due to the necessary context of the word. The disclosed statistical filter eliminates the need for defined sets of stop-words, as the truncation described above eliminates both typical stop-words and words that, alone, produce similar results to stop words.

Figure 9:
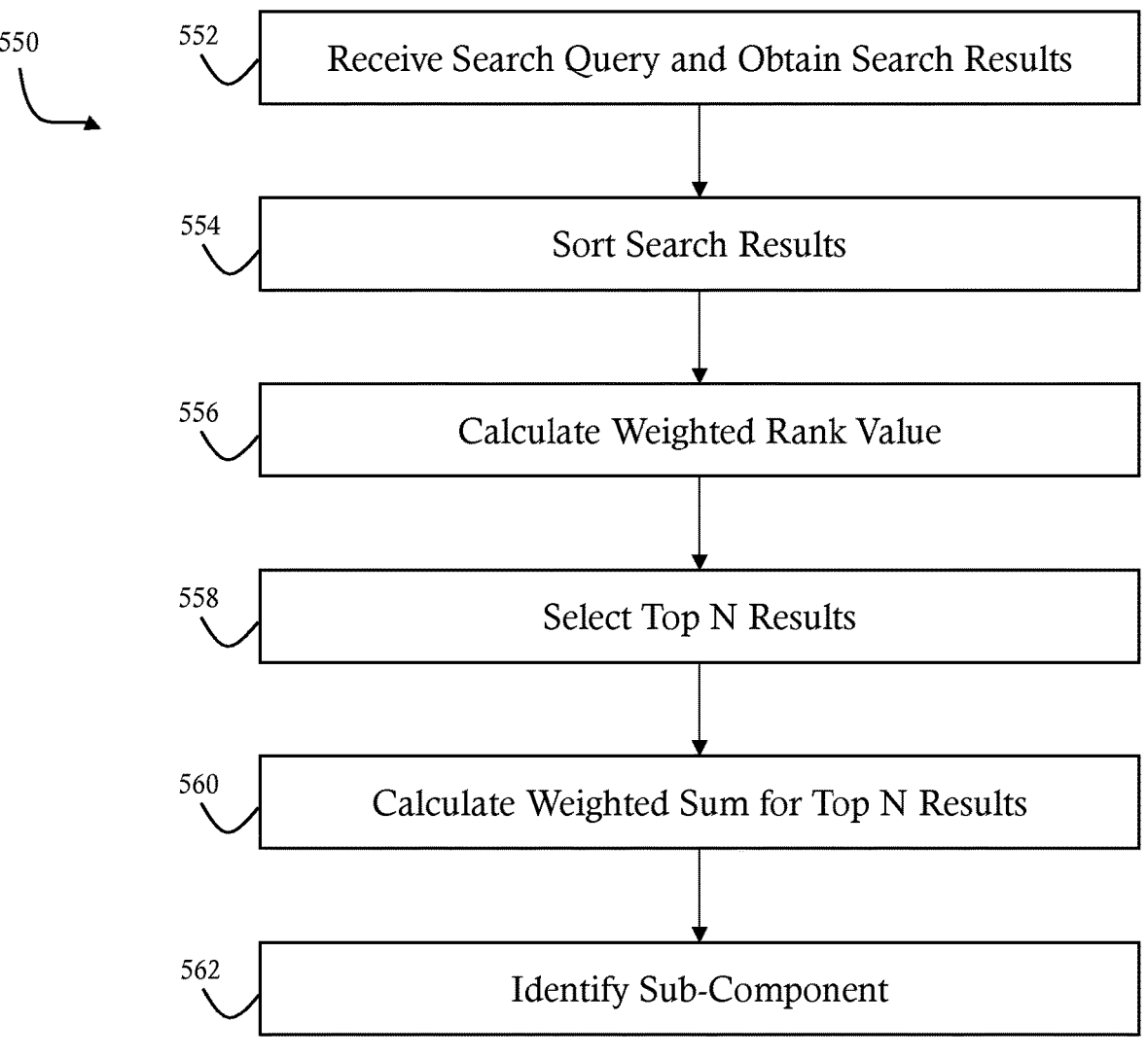
FIG. 9 is a flowchart illustrating a domain filter configured to improve accuracy of search results in a service intelligence platform, in accordance with some embodiments.

FIG. 9 is a flowchart 550 illustrating a domain filtering process configured to improve accuracy of search results in a service intelligence platform, in accordance with some embodiments. In some instances, data elements from the data sources 210 can be prone to one or more challenges or issues that can increase search time and decrease search accuracy. For example, common challenges found in service ticket data includes human errors (e.g., misidentification of information, misspellings, etc.), cascading multiple service issues being identified under a single service ticket over a small time window, proactive maintenance of parts in other sub-components being included with replacement of part in relation to primary identified issue, etc. Inclusion of such challenges in the data set produce outliers during search identification.

Complex machines such as a medical scanner can include multiple hierarchies of individual parts. As used herein, the term sub-component can refer to any component in a hierarchical level, such as, for example, a first component that constitutes a smaller part or group of a larger component. It will be appreciated that a sub-component identified at a first hierarchical level can itself have sub-components at a subsequent hierarchical level that can be identified separately and/or included with the sub-component at the first hierarchical level. In some embodiments, a sub-component can be identified by integrating service ticket data with one or more additional data sources, such as, for example, a parts hierarchical dataset from a supply chain database system.

In some embodiments, to limit or remove outlier results, a domain filtering process is implemented. The domain filtering process, as illustrated in FIG. 9, is configured to identify or detect a sub-component of a machine based on the issues or symptoms associated with the search query. At step 552, a search query is received and search results are obtained by a search component, such as the search component 222 discussed above. The search results are obtained based on the search query, as discussed above. At step 554, the search results are sorted based on a ranking as determined by the search component 222. The search results can be sorted in a descending order of rank (e.g., having the highest rank result provided first) or can be sorted in any suitable arrangement.

At step 556, a weighted rank value is calculated for each search results. In some embodiments, the weighted rank value is calculated by dividing the rank of the current search result by the max rank of the search:

Rank/Max(Rank)

Although specific embodiments are discussed herein, it will be appreciated that a weighted rank value can be calculated using any other suitable calculation.

At step 558, the search results are filtered (e.g., limited) to the top predetermined number (N) of results (e.g., records) and, at step 560, a weighted sum of each sub-component in a system is calculated for the top N records. For example, in some embodiments, the weighted sum is a net weighted sum calculated for each sub-component included in and/or identified in conjunction with the top N records. For each sub-component, the rank and record value is multiple for each record in which the sub-component is identified. The multiplied rank and record value for each record is summed to generate a net weighted sum. Although certain embodiments are described herein, it will be appreciated that the net weighted sum can be calculated using any suitable process, such as, for example, an algorithmic and/or machine learning process.

At step 562, the net weighted sums of each sub-component in the search can be used to filter the results, for example, filtering results based on a descending rank order for the net weighted sums. In some embodiments, the sub-component having the highest net weighted sum can be identified as the sub-component associated with the search query. In some embodiments, a set of M sub-components can be associated with the search. The search results can subsequently be domain-limited to only search results (e.g., tags, service tickets, etc.) that are associated with the identified sub-component, as discussed above.

Although the subject matter has been described in terms of exemplary embodiments, it is not limited thereto. Rather, the appended claims should be construed broadly, to include other variants and embodiments, which can be made by those skilled in the art.

What is claimed is:

1. A service intelligence system, comprising:
   a non-transitory memory having instructions stored thereon; and
   a processor configured to read the instructions to:
      receive, over a network, a search query associated with an occurrence of a device error;
      search a database to identify a first set of historical data elements each associated with one or more errors similar to the device error, wherein the search includes a natural language search process based on one or more terms extracted from the search query, wherein each historical data element in the first set of historical data elements is associated with one or more first tags;
      determine a machine identifier from the search query;
      retrieve machine log events of a machine associated with the machine identifier for a predetermined time period that starts before the device error occurred and ends after the device error occurred;
      filter the machine logs to identify one or more anomalous log events;
      search a database based on the one or more anomalous log events associated with the machine identifier to identify a second set of historical data elements having historical anomalous machine log events similar to the one or more anomalous log events;
      determine a similarity score between the device error and the historical service tickets based on a correspondence between the anomalous machine log events and the historical machine log events associated with the second set of historical data elements, wherein each of the one or more historical anomalous machine log events is associated with one or more second tags;
      generate a ranking of the second set of historical data elements based on the similarity score;
      generate a result set including at least one corrective action or at least one part replacement associated with the one or more first tags and at least one corrective action or at least one part replacement associated with the one or more second tags associated with a highest ranked subset of the second set of historical data elements;

remove contextual stop words from the result set by truncating a heavy tailed distribution of the result set; and transmit, over the network, the result set in response to the search query.

2. The service intelligence system of claim 1, wherein the similarity score is a value between 0 and 1, and wherein the similarity score for a corresponding historical data element of the second set of historical data elements is calculated by incrementing the similarity score by a predetermined value for each of the one or more anomalous machine log events that corresponds to a historical anomalous machine log event associated with the corresponding historical data elements.

3. The service intelligence system of claim 1, wherein the search string comprises a text search string, and the processor is configured to determine the machine identifier by applying a natural language process to the text search string.

4. The service intelligence system of claim 1, wherein at least one of the first set of tags or the second set of tags are generated by natural language processing of the one or more historical data elements.

5. The service intelligence system of claim 1, wherein at least one of the first set of historical data elements or the second set of historical data elements comprise service tickets, machine logs, part replacement logs, or a combination thereof.

6. The service intelligence system of claim 1, wherein the result set of corrective actions or part replacements provided in response to the search query is filtered using a domain filter, a statistical filter, or both.

7. The service intelligence system of claim 1, wherein the processor is configured to:

determine a maximum rank of second set of historical data elements;

determine, for each historical data element of the second set of historical data elements, a weighted rank based on dividing a corresponding rank of a corresponding historical data element by the maximum rank; and select the highest ranked subset of the second set of historical data elements based on the weighted ranks.

8. A service intelligence system, comprising:

a memory having instructions stored thereon, and a processor configured to read the instructions to:

implement a backend process, comprising:

receiving a plurality of historical data elements associated with at least one service issue and at least one corrective action or part replacement performed for at least one machine;

applying a segmentation process to each historical data element of the plurality of historical data elements to identify one or more segmented portions of each historical data element of the plurality of historical data elements;

applying a natural language process to at least one of the one or more segmented portions of each historical data element of the plurality of historical data elements to generate a plurality of tags for each historical data element of the plurality of historical data elements; and associating, within a database, at least one historical data element of the plurality of historical data element with a first tag of the plurality of tags and one or more historical anomalous machine log events with a second tag of the plurality of tags, wherein each of the one or more historical anomalous machine log events are associated with a historical machine identifier associated with the at least one historical data element and a historical predetermined time period corresponding to a service issue represented by a corresponding historical data element of the plurality of historical data elements, and wherein the historical predetermined time period begins before the service issue occurred and ends after the service issue was resolved; and implement a frontend process, comprising:

receiving, over a network, a search query associated with an occurrence of a device error;

search the database to identify a first set of historical data elements each associated with a service issue similar to the device error, wherein the search includes a natural language search process based on one or more terms extracted from the search query, wherein each historical data element in the first set of historical data elements is associated with the first tag;

determine a machine log identifier from the search query;

identifying one or more anomalous machine log events for a machine associated with the machine identifier for a predetermined time period;

determine a similarity score between the device error and each historical data element of the plurality of historical data elements based on a correspondence between the anomalous machine log events for the machine associated with the machine identifier and each of the one or more historical machine log events associated with each historical data element, and wherein each of the one or more historical machine log events is associated with at least one second tag;

generating a ranking of the plurality of historical data elements based on the similarity score;

generating a result set including the at least one corrective action or the at least one part replacement associated with the first tag and at least one corrective action or at least one part replacement associated with the at least one second tag associated with a highest ranked subset of the plurality of historical data elements;

removing contextual stop words from the result set by truncating a heavy tailed distribution of the result set; and transmitting, over the network, the result set in response to the search query.

9. The service intelligence system of claim 8, wherein the similarity score is a value between 0 and 1, and wherein the similarity score for a corresponding historical data element of the second set of historical data elements is calculated by incrementing the similarity score by a predetermined value for each of the one or more anomalous machine log events that corresponds to a historical anomalous machine log event associated with the corresponding historical data elements.

10. The service intelligence system of claim 8, wherein the result set is filtered using a domain filter, a statistical filter, or both.

11. The service intelligence system of claim 8, wherein the natural language process comprises segmentation, part of speech tagging, or a combination thereof.

12. The service intelligence system of claim 8, wherein the natural language process comprises clustering.

\* \* \* \* \*